US008041300B2

(12) United States Patent
Dorogusker et al.

(10) Patent No.: US 8,041,300 B2
(45) Date of Patent: Oct. 18, 2011

(54) ADAPTER

(75) Inventors: Jesse Dorogusker, Los Altos, CA (US); Emily C. Schubert, San Jose, CA (US); Donald Ginsburg, San Francisco, CA (US); Gregory T. Lydon, Santa Cruz, CA (US); Lawrence G. Bolton, Fremont, CA (US)

(73) Assignee: Apple Inc, Cupertino, CA (US)

( * ) Notice: Subject to any disclaimer, the term of this patent is extended or adjusted under 35 U.S.C. 154(b) by 62 days.

(21) Appl. No.: 12/239,671

(22) Filed: Sep. 26, 2008

(65) Prior Publication Data

US 2010/0081337 A1 Apr. 1, 2010

(51) Int. Cl.
*H04B 7/00* (2006.01)

(52) U.S. Cl. ..................... 455/41.3; 455/41.2; 455/41.1; 455/557; 455/556.2; 455/559

(58) Field of Classification Search ................. 455/41.1, 455/41.2, 41.3, 557–559, 556.1, 556.2, 575.6
See application file for complete search history.

(56) References Cited

U.S. PATENT DOCUMENTS 4,223,406 A 9/1980 Someno
4,249,255 A 2/1981 Molinari
4,344,186 A 8/1982 Ong
6,127,941 A 10/2000 Van Ryzin
6,934,568 B2 * 8/2005 Charlier et al. ............ 455/575.3
7,280,847 B2 * 10/2007 Goldthwaite et al. ......... 455/558
7,564,678 B2 * 7/2009 Langberg et al. ........ 361/679.01
7,831,756 B1 * 11/2010 Fils .............................. 710/303
2002/0003471 A1 1/2002 Troedel et al.
2002/0032813 A1 3/2002 Hosaka et al.
2004/0127256 A1 * 7/2004 Goldthwaite et al. ........ 455/558
2004/0151327 A1 8/2004 Marlow
2005/0070157 A1 3/2005 Neo et al.
2005/0157458 A1 7/2005 Yin et al.

(Continued)

FOREIGN PATENT DOCUMENTS

DE 30 32 798 A1 3/1981

(Continued)

OTHER PUBLICATIONS

"Ibizia iFIPO Bluetooth Module with iPod Dock Connector for oPod Access"; http://www.amazon.com/Ibizia-iFIPO-Bluetooth-Connector-Accessories/dp/B00160QW, downloaded on Oct. 25, 2010, 6 pages.

(Continued)

*Primary Examiner* — Edward Urban
*Assistant Examiner* — Ganiyu Hanidu
(74) *Attorney, Agent, or Firm* — Kilpatrick Townsend & Stockton LLP

(57) ABSTRACT

Circuits, methods, and apparatus that provide compatibility among incompatible accessories and portable media players. One example provides an adapter having a connector receptacle to mate with an accessory's connector insert and a connector insert to mate with a portable media player's connector receptacle. Another example provides an adapter having a direct connection between pins on the connector insert and pins on the connector receptacle that are used for compatible signals. Another example provides an adapter including a DC-to-DC converter that receives a first power supply from an accessory and provides a second power supply to a portable media player. Another translates signals using different signaling technologies. Authentication and identification circuitry may also be included. Other examples may employ wireless technologies instead of either or both the connector insert and connector receptacle.

16 Claims, 14 Drawing Sheets

U.S. PATENT DOCUMENTS

| | | | | |
|---|---|---|---|---|
| 2005/0224589 | A1* | 10/2005 | Park et al. | 235/492 |
| 2005/0266879 | A1* | 12/2005 | Spaur et al. | 455/556.2 |
| 2007/0015457 | A1 | 1/2007 | Krampf et al. | |
| 2007/0086724 | A1* | 4/2007 | Grady et al. | 386/46 |
| 2007/0087725 | A1* | 4/2007 | Anderson | 455/348 |
| 2008/0163049 | A1 | 7/2008 | Krampf | |
| 2008/0214237 | A1* | 9/2008 | Cupps et al. | 455/556.2 |
| 2008/0221715 | A1* | 9/2008 | Krzyzanowski et al. | 700/90 |
| 2008/0227393 | A1* | 9/2008 | Tang et al. | 455/41.3 |

FOREIGN PATENT DOCUMENTS

| | | | |
|---|---|---|---|
| DE | 44 10 741 | A1 | 9/1994 |
| DE | 44 32 589 | A1 | 3/1996 |
| DE | 195 21 057 | A1 | 12/1996 |
| EP | 0 899 889 | A2 | 3/1999 |
| EP | 1 150 444 | A1 | 10/2001 |
| GB | 2 209 429 | A | 12/1995 |
| GB | 2 308 512 | A | 6/1997 |
| WO | WO 2007/022297 | A2 | 2/2007 |

OTHER PUBLICATIONS

"Customer Reviews: Ibizia iFIPO Bluetooth Module with iPod Dock Connector"; http://www.amazon.com/Ibizia-iFIPO-Bluetooth-Connector-Accessories/product-reviews, downloaded on Oct. 25, 2010, 5 pages.

"Customer Reviews: Anycom BluNa Bluetooth Nano iPod Adaptor"; http://www.amazon.com/Anycom-BluNa-Bluetooth-Nano-Adaptor.product-reviews/B00, downloaded on Oct. 25, 2010, 4 pages.

"Customer Reviews: ANYCOM FIPO Bluetooth Receiver—Bluetooth wireless . . . "; http://www.amazon.com/ANYCOM-FIPO-Bluetooth-Receiver-wireless-/product-reviews, downloaded on Oct. 25, 2010, 5 pages.

"Anycom BluNa iPod Bluetooth Adapter—iPod Accessory Reviews by Mobile Tech Review"; http://www.mobletechreview.com/iPod/AnyCom-BluNa.htm, downloaded on Oct. 25, 2010, 3 pages.

* cited by examiner

Adapter 310 provides straight through connector for power and signals.

Adapter 410 provides power conversion.
Adapter 410 provides straight through connector for signals.

Adapter 510 provides data conversion.
Adapter 510 provides power conversion.
Adapter 510 provides straight through connector for audio and video.

Adapter 610 spoofs authentication sequence.
Adapter 610 provides data conversion.
Adapter 610 provides power conversion.
Adapter 610 provides straight through connector for audio and video.

Adapter 710 provides video conversion.
Adapter 710 provides data conversion.
Adapter 710 provides power conversion.
Adapter 710 provides straight through connector for audio and video.

Adapter 1010 translates between wired and wireless.
Adapter 1010 spoofs authentication sequence.
Adapter 1010 provides data conversion.

Adapter 1210 translates between wired and wireless.
Adapter 1210 spoofs authentication sequence.
Adapter 1210 provides data conversion.

Adapter 1410 translates between over two wireless links.
Adapter 1410 spoofs authentication sequence.
Adapter 1410 provides data conversion.

ADAPTER

BACKGROUND

Portable electronic devices, such as portable media players, have become ubiquitous the past several years. As they have proliferated, so have the number and types of accessories that are designed to interact with these portable media players. These accessories range in complexity, including, for example, simple speaker systems and complex automotive entertainment systems.

These accessories commonly communicate with a portable media player using a connector system. This connector system typically includes a connector insert on the accessory and a connector receptacle on the portable media player. A user fits the connector receptacle of the media player over the connector insert on the accessory, thereby forming electrical connections for data and power.

Users may have more than one type of media player. For example, a user may have a high-capacity portable media player for home use and a smaller, low-capacity portable media player for use at the gym.

For various reasons, these media players may have different sized connectors. For example, the media players may be made by different manufacturers. Also, they may be made by one manufacturer, but a newer media player may have a more advanced, smaller sized connector receptacle.

For these reasons, a user may encounter a situation where she has multiple portable media players but one or more of these portable media players are incompatible with one of her accessories. It may be undesirable to acquire more than one such accessory, not only due to cost reasons, but also because of other concerns, such as limited space. It also may be undesirable to forgo use of the incompatible portable media player, particularly when it contains unique content.

Thus, what is needed are circuits, methods, and apparatus that provide compatibility among incompatible accessories and portable media players.

SUMMARY

Accordingly, embodiments of the present invention provide circuits, methods, and apparatus that provide compatibility among incompatible accessories and portable electronic devices. An exemplary embodiment of the present invention provides an adapter having a connector receptacle to mate with a connector insert located on an accessory and a connector insert to mate with a connector receptacle on a portable media player.

A connector insert on an accessory may be incompatible with a connector receptacle on a portable media player in at least two ways. First, this incompatibility may be physical; the connector insert of the accessory may not fit the connector receptacle of the portable media player. Second, this incompatibility may be electrical; signals or power received or provided at the connector insert of the accessory may be electrically incompatible with signals or power received or provided at the connector receptacle of the portable media player.

Where the incompatibility is physical, an embodiment of the present invention provides an adapter having a connector receptacle to mate with a connector insert on an accessory and a connector insert to mate with a connector receptacle on a portable media player. One or more electrical connections may be made between pins of the connector insert and pins of the connector receptacle on the adapter. Where the incompatibility is electrical, an embodiment of the present invention provides one or more conversion circuits placed in the adapter between pins of the connector insert and pins of the connector receptacle on the adapter. Where the incompatibility is both physical and electrical, both these techniques may be employed by embodiments of the present invention.

In some situations, some or all of the signaling and power may be compatible between a portable media player and an accessory. Accordingly, another exemplary embodiment of the present invention provides an adapter having a pass-through connection for compatible signals that need to be shared between the portable media player and accessory. For example, audio line out and video out signals from a portable media player may often be directly provided to an accessory, where the accessory acts as speakers or as a monitor.

In other situations, a power supply provided by an accessory may be incompatible with a power supply input on a portable media player. Accordingly, another exemplary embodiment of the present invention provides an adapter including a DC-to-DC converter that receives a first power supply from an accessory and provides a second power supply to a portable media player.

In other situations, some or all the signaling may be incompatible between a portable media player and an accessory. That is, the signaling may be incompatible in one or more of several layers, such as a physical, transport, or packet layer. Accordingly, another exemplary embodiment of the present invention provides an adapter that includes translation circuitry that can translate the incompatible signals. This incompatibility may arise because different signaling technologies are used. For example, an accessory may use signaling compliant with a parallel technology, while a media player may use USB2 compliant signaling. In this case, an adapter according to an embodiment of the present invention can include circuitry for translating between the two signaling technologies.

Some accessories may include authentication circuitry. This circuitry queries a portable media player for its authentication information. In some circumstances, the portable media player may be from a different manufacturer and may not be able to reply to this authentication query. Accordingly, another exemplary embodiment of the present invention provides an adapter having authentication circuitry that can spoof authentication responses to authentication queries from an accessory. In other embodiments of the present invention, the adapter can provide authentication information to an accessory on its own volition.

Some portable media players and accessories may include identification circuitry. This circuitry identifies the portable media player or accessory and lets the other know its capabilities. In some circumstances, a portable media player may not be able to properly identify itself to an accessory. Accordingly, another exemplary embodiment of the present invention provides an adapter having identification circuitry that allows the adapter to provide identification information to the accessory on behalf of the portable media player.

Embodiments of the present invention may have one of a number of form factors. Some embodiments of the present invention may be shaped as a unit that resides on top of an accessory. Other embodiments of the present invention may include a cable, for example, where adapter circuitry is included in one end of the cable.

Another exemplary embodiment of the present invention provides an adapter where one or more of these connector interfaces are replaced with wireless circuitry. In a specific example, the portable media player includes wireless capabilities while an accessory does not. Accordingly, another embodiment of the present invention provides an adapter that can have a connector receptacle to mate with a connector insert located on an accessory or docking station. This adapter can also have a wireless circuit for communicating with the media player. The adapter can translate signals between the accessory and the portable media player.

In another specific embodiment of the present invention, the portable media player does not include wireless capabilities while an accessory does. In this case, an adapter can have a connector insert to mate with a connector receptacle located on the portable media player. This adapter can also have a wireless circuit for communicating with the accessory. The adapter can translate signals between the accessory and the portable media player.

In another specific embodiment of the present invention, both the portable media player and accessory include wireless capabilities. In this case, an adapter can have wireless circuitry for communicating with the accessory and the portable media player. In various embodiments of the present invention, the portable media player and the accessory can use wireless communications of different wireless technologies. In this case, the adapter can translate wireless signals of a first technology used by the portable media player and wireless signals of a second technology used by the accessory.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
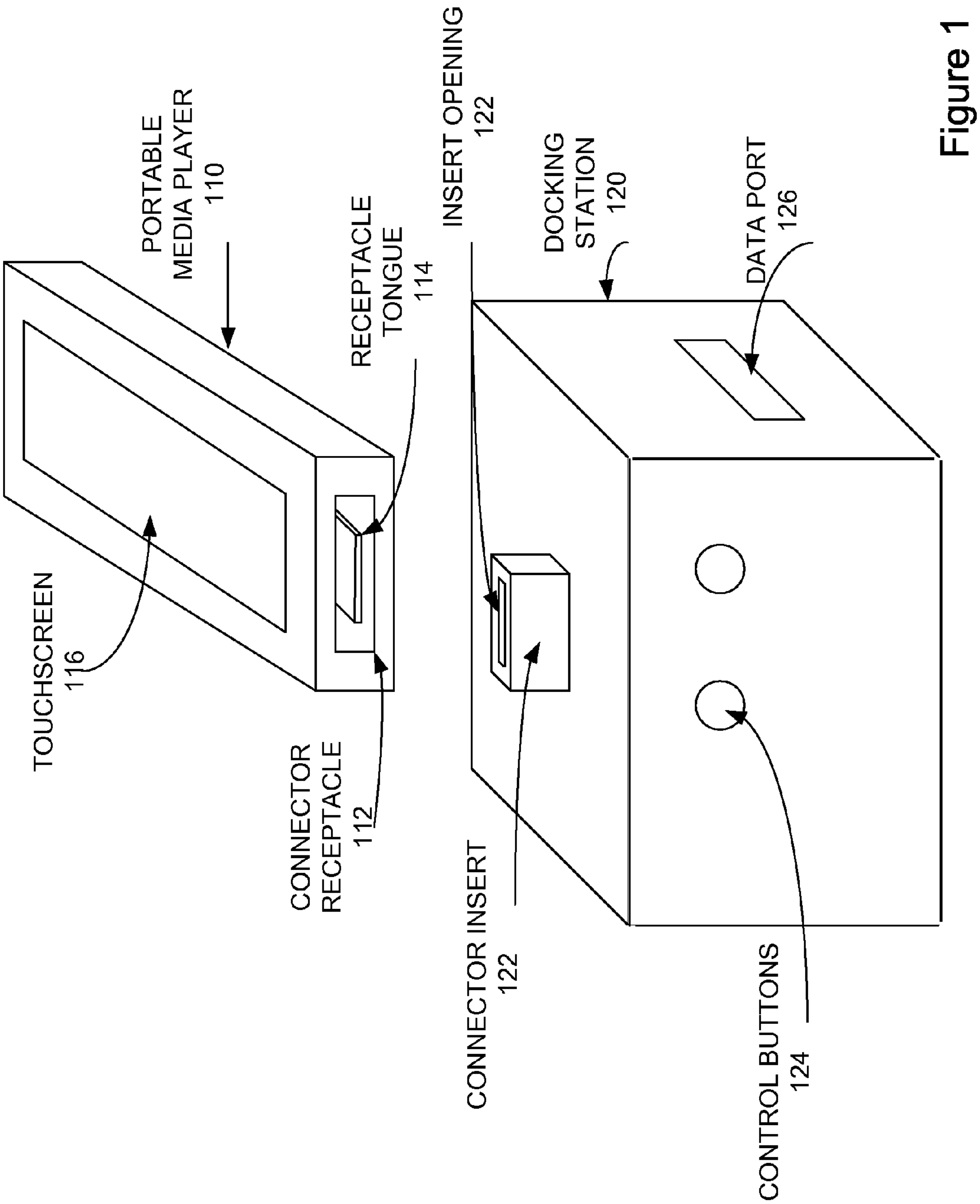
FIG. 1 illustrates an electronic system that is improved by the incorporation of an embodiment of the present invention.

FIG. 1 illustrates an electronic system that is improved by the incorporation of an embodiment of the present invention. This figure, as with the other figures, is shown for illustrative purposes and does not limit either the possible embodiments of the present invention or the claims.

This figure illustrates a portable electronic device that may attach to an accessory. In this example, the portable electronic device is a portable media player 110. This portable media player 110 may be an iPod, iPhone, or similar device designed and manufactured by Apple Inc. of Cupertino, Calif. In this example, the portable media player 110 includes a touchscreen 116. Other portable media players 110 may have other types of input and display devices.

In this example, the accessory is a docking station 120. In other embodiments, the accessory may be an automotive radio, transmitter, cable, radio, alarm clock, or other device. The accessory includes control buttons 124 for controlling the docking station 120. The docking station 120 further includes a data port 126, which may be used for communicating with one or more external devices.

The portable media player 110 further includes a connector receptacle 112. The connector receptacle 112 includes a receptacle tongue 114, which may include pins or contacts (not shown.) The docking station 120 includes a connector insert 122, which further includes an insert opening 124. The insert opening 124 may also include contacts or pins (not shown.) When the portable media player 110 is mated with the docking station 120, the connector insert 122 of the docking station 120 fits into the connector receptacle 112 of the portable media player 110.

Various portable media players 110 may have different shapes and sizes, though the connector receptacles 112 may remain the same. To allow a proper fit of these different shaped portable media players 110, removable inserts (not shown) may be used to mechanically fit the bottom of the portable media player 110 to a recess (not shown) on the docking station 120.

Aside from this mechanical fitting, there are at least two other types of incompatibility that may arise between a connector insert on an accessory and a receptacle on a portable media player. Again, the connector receptacle may be physically incompatible with the connector insert, that is, they may have incompatible sizes. Also, signals at or needed by a connector receptacle may not be electrically compatible with signals at or needed by a connector insert.

A connector insert on an accessory may not be compatible with a connector receptacle on a portable electronic device or portable media player because the connector insert is designed to mate with products made by a first manufacturer, while the portable media player is instead made by a second manufacture. Also, a portable media player manufacturer may change the design of a connector receptacle for some products. For example, a smaller connector may be needed to enable the design of smaller portable media players.

Also, a connector insert on an accessory may not be compatible with a connector receptacle on a portable electronic device or portable media player because one or more signals or power supply outputs on either the insert or receptacle are incompatible with inputs on the other end. This may occur at one or more levels of signaling. For example, a physical layer used to transmit and receive signals may be incompatible between the accessory and media player. Specifically, signal voltages and other physical parameters may be different. Also, a transport level, which specifies signal frequency and other parameters, may be different between the devices. The packet structure layer, which defines how commands and data are formatted, and multi-packet logic levels, which define sequences of commands, may also vary among devices.

Accordingly, embodiments of the present invention provide adapters that allow communication between a portable media player and an accessory, wherein a connector receptacle on the portable media player and a connector insert on an accessory are incompatible in one or both of these ways. One example is shown in the following figure.

Figure 2:
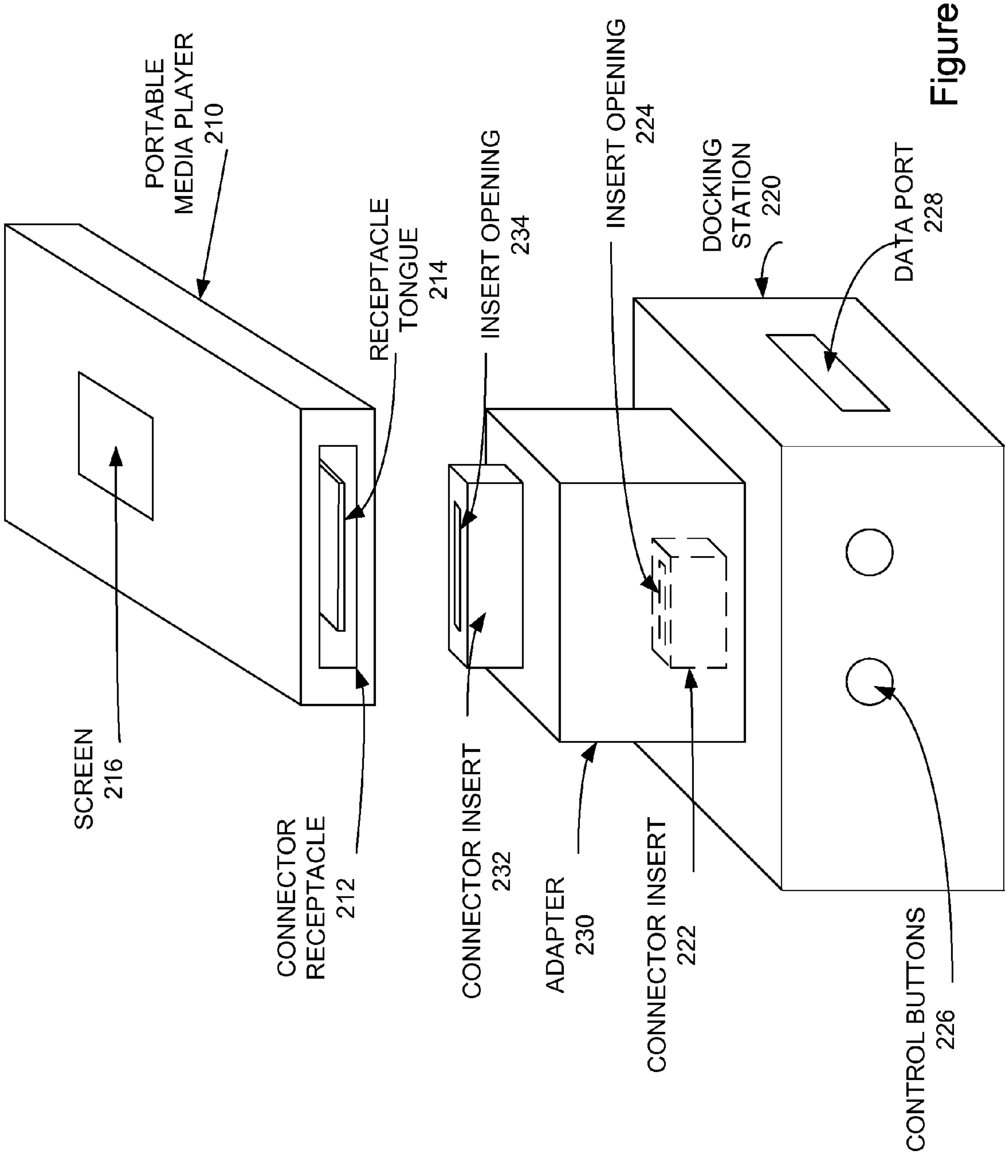
FIG. 2 illustrates an electronic system according to an embodiment of the present invention.

FIG. 2 illustrates an electronic system according to an embodiment of the present invention. This figure includes a portable electronic device that may be connected to an accessory using an adapter according to an embodiment of the present invention. In this example, the portable electronic device is a portable media player 210. The portable media player 210 includes a screen 216. The portable media player 210 may include other input controls (not shown.) The portable media player 210 further includes a connector receptacle 212, which includes a receptacle connector tongue 214. Contacts or pins may be located on the connector receptacle tongue 214. The accessory is a docking station 220. Again, control buttons 226 and a data port 228 are included. The docking station 220 includes a connector insert 222, which includes an insert opening 122.

In this example, the connector receptacle 212 is not compatible with the connector insert 222. Again, this incompatibility may be physical or electrical. Accordingly, the adapter 230 is deployed between the portable media player 210 and the docking station 220. The adapter 230 includes a connector insert 232, which has an insert opening 234. The insert opening 234 may include contacts or pins. A connector receptacle (not shown for clarity) on the adapter 230 accepts the connector insert 222. The connector receptacle 212 on the portable media player 210 accepts the connector insert 232. In this way, an electrical connection between the docking station 220 and the media player 210 is achieved.

Again, a connector insert on an accessory may be physically incompatible with a connector receptacle on a portable media player. However, some or all of the power and signal lines between the two may be compatible. If all power and signal lines are compatible, or if at least those power and signal lines that are needed are compatible, a simple pass-through adapter may be used. An example is shown in the following figure.

Figure 3:
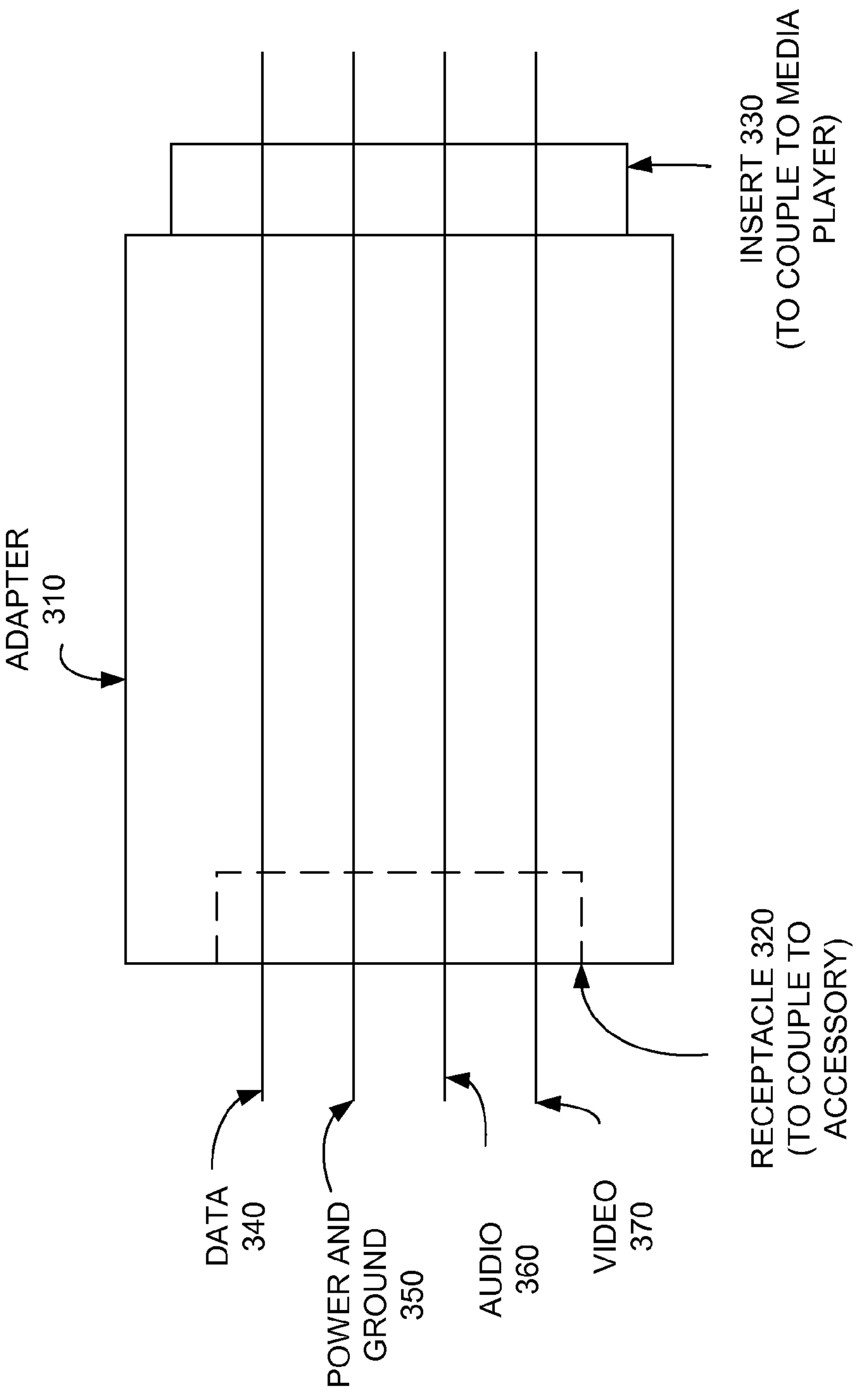
FIG. 3 illustrates a pass-through connector according to an embodiment of the present invention.

FIG. 3 illustrates a pass-through connector according to an embodiment of the present invention. This example includes an adapter 310 having a receptacle 322 to couple to an accessory, and an insert 330 to couple to a media player. In this example, the insert 330 and receptacle 320 are physically incompatible. However, the receptacle 320 is compatible with a connector insert on an accessory, while the insert 330 is compatible with a receptacle on a media player. Examples of the connector inserts and connector receptacles that may be used can be found in co-pending U.S. patent application Ser. No. 10/423,490, filed Apr. 25, 2003, titled Media Player System, which is incorporated by reference.

In various embodiments of the present invention, different types of signals and power may be communicated between an accessory and portable electronic device. For example, data signals, such as USB, Ethernet, serial port, or other signals, may be communicated. Audio signals, such as audio line out signals, may be shared. Video, such as composite video, DisplayPort, Digital Visual Interface (DVI) or other types of video data may be communicated. Other information, such as test or status information, may also be passed between devices.

Accordingly, data 340, power and ground 350, audio 360, and video 370, may pass directly through the adapter 310. In other embodiments, some signals may not be compatible, but they may also be unneeded. These signals may simply not be passed through the adapter. In one specific example, an audio signal provided by a media player is compatible with an audio signal input on an accessory, while the accessory and portable media player may use different data signaling. If the data lines 340 are not needed, they may be left disconnected by the adapter, while the audio lines 360 can be connected from the insert 330 to the receptacle 320.

In other systems, a power supply provided by an accessory may be incompatible with a power supply input requirement of a portable media player. In such a case, a power supply converter can be used. An example is shown in the following figure.

Figure 4:
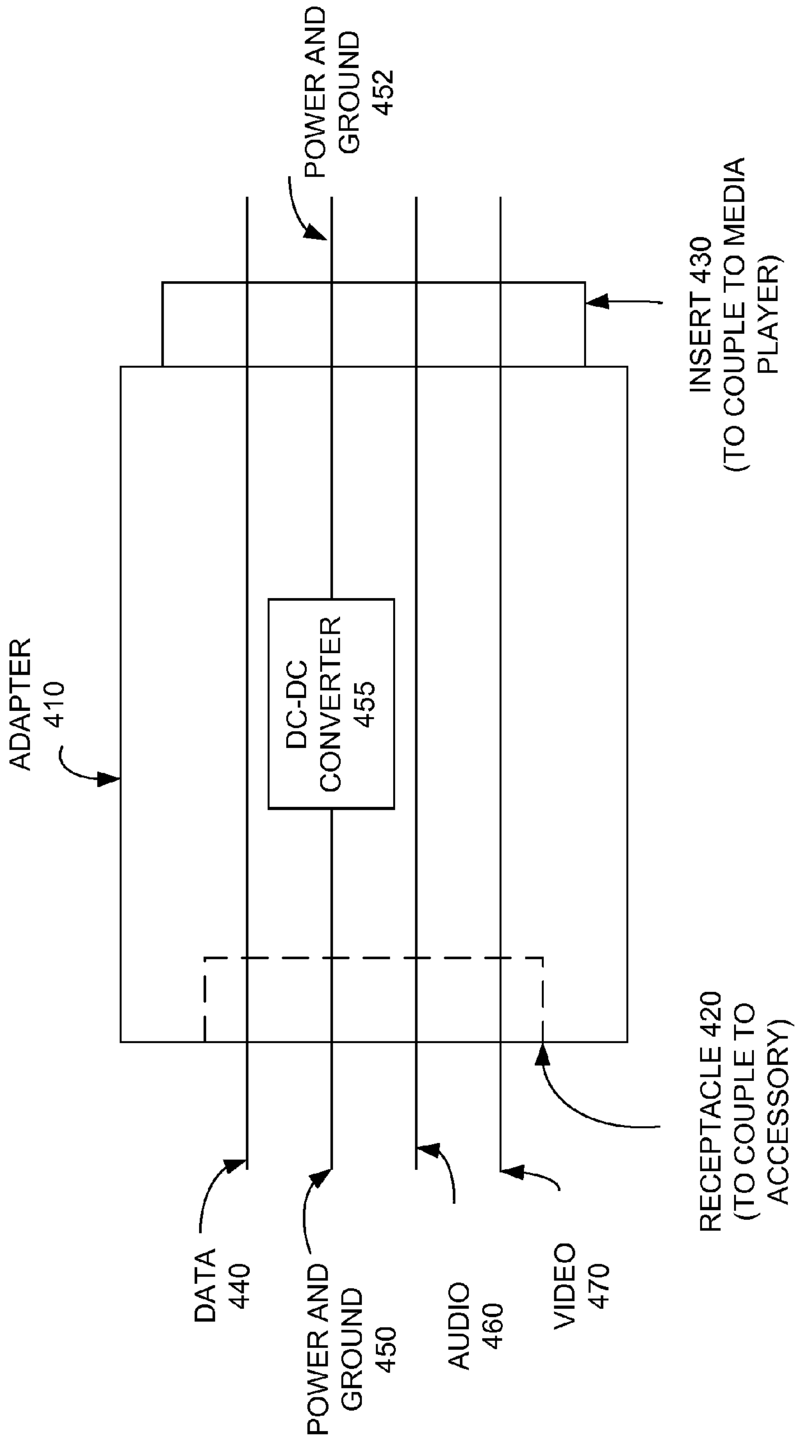
FIG. 4 illustrates an adapter including a DC-to-DC converter according to an embodiment of the present invention.

FIG. 4 illustrates an adapter including a DC-to-DC converter according to an embodiment of the present invention. This example includes an adapter 410 having a connector receptacle 422 to couple to an accessory and a connector insert 432 to couple to a media player. A first power supply received by the adapter on line 450 is converted to a second power supply and provided on lines 452 to a media player via the insert 430.

Again, adapters according to embodiments of the present invention can compensate for both physical and electrical incompatibilities between an accessory and a portable electronic device such as a portable media player. In some systems, incompatibility may arise in the data signaling used by an accessory and the data signaling used by a portable media player. For example, one or more of the physical, transport, or packet levels discussed above may be different. Accordingly, various embodiment of the present invention provide a data converter that can translate between these two types of data signaling. An example is shown in the following figure.

Figure 5:
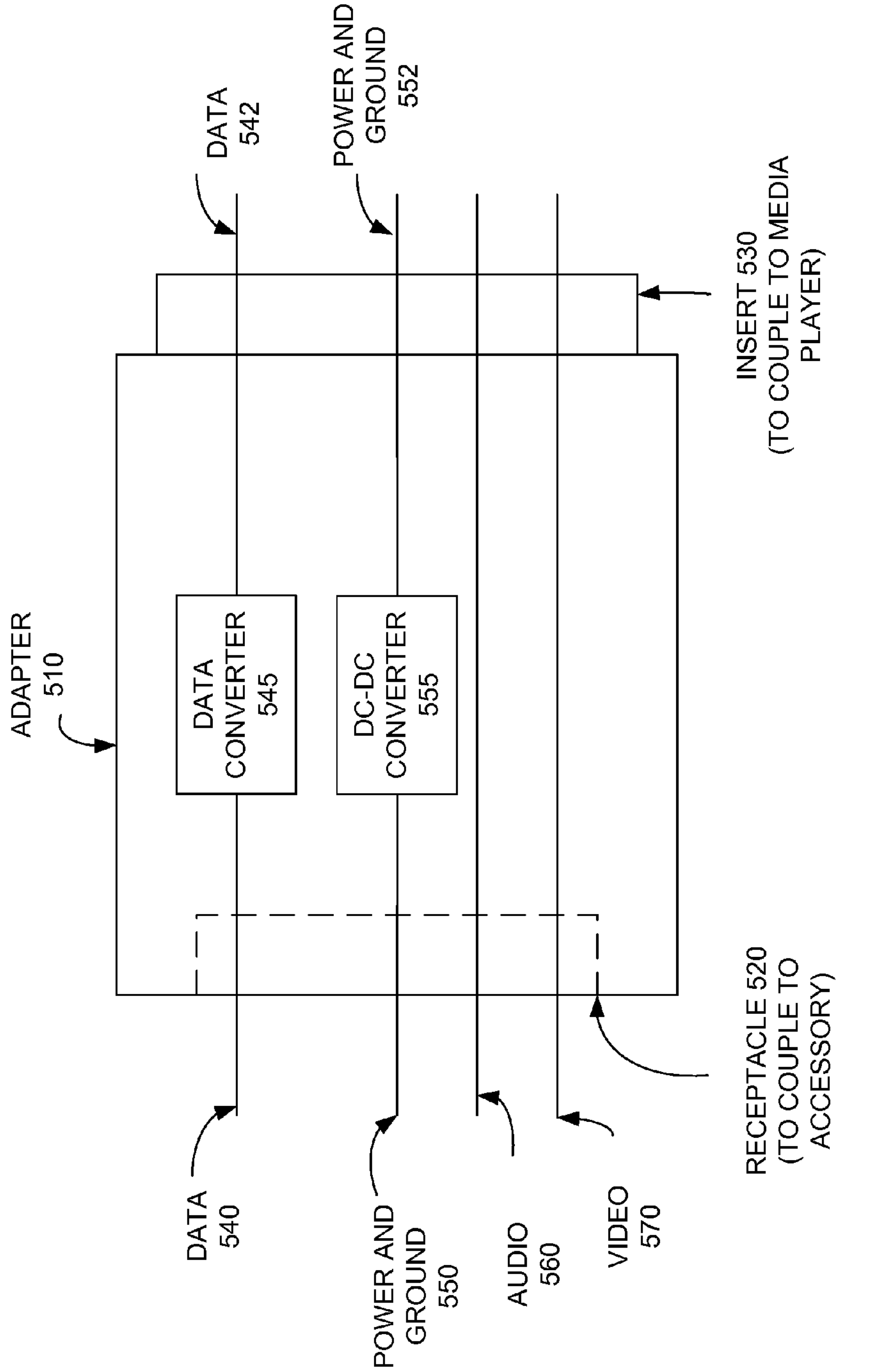
FIG. 5 illustrates an adapter capable of translating signals according to an embodiment of the present invention.

FIG. 5 illustrates an adapter capable of translating signals according to an embodiment of the present invention. This example includes an adapter 510 having a receptacle 522 to couple to an accessory or docking station and an insert 532 to couple to a portable electronic device, such as a portal media player. In this case, one or more of the data signaling protocol layers used by an accessory is different than the data signaling protocol layers used by a portable media player. Accordingly, a data converter 545 is included in the adapter 510.

Data converter 535 receives data having a first protocol on lines 540 and provides data having the second protocol on lines 542. Similarly, data converter 545 receives data having the second protocol on lines 542 and provides data having the first protocol on lines 540.

The amount of translation needed may vary. For example, both the accessory and portable electronic device may use the same standard, such as USB3, but they may use different packet structures for commands. In such a situation, only a translation between packet structures is needed. In other situations, the required translation may be more complex. For example, one side may use a standard or proprietary signaling technology such as USB2, while the other uses FireWire, or other such standard or proprietary technology. In this case, the converter 535 acts as a translator between these two standards. In various embodiments of the present invention, this translation, as well as the other electronic translations discussed, may occur partly on either or both the portable media player and the accessory.

Some accessories require a portable electronic device to request authorization information. If this information is not requested, operation may cease. If a portable media player is not able to provide an authentication request, it may not be able to be used with an accessory, even if one of the above adapters is available. Accordingly, embodiments of the present invention may employ authentication-spoofing circuitry.

Some accessories can also make use of identification information provided by a portable media player. In this way, the accessory can learn what kinds of signals to expect from or provide to the portable media player. Accordingly, embodiments of the present invention may also employ identification circuitry. An example is shown in the following figure.

Figure 6:
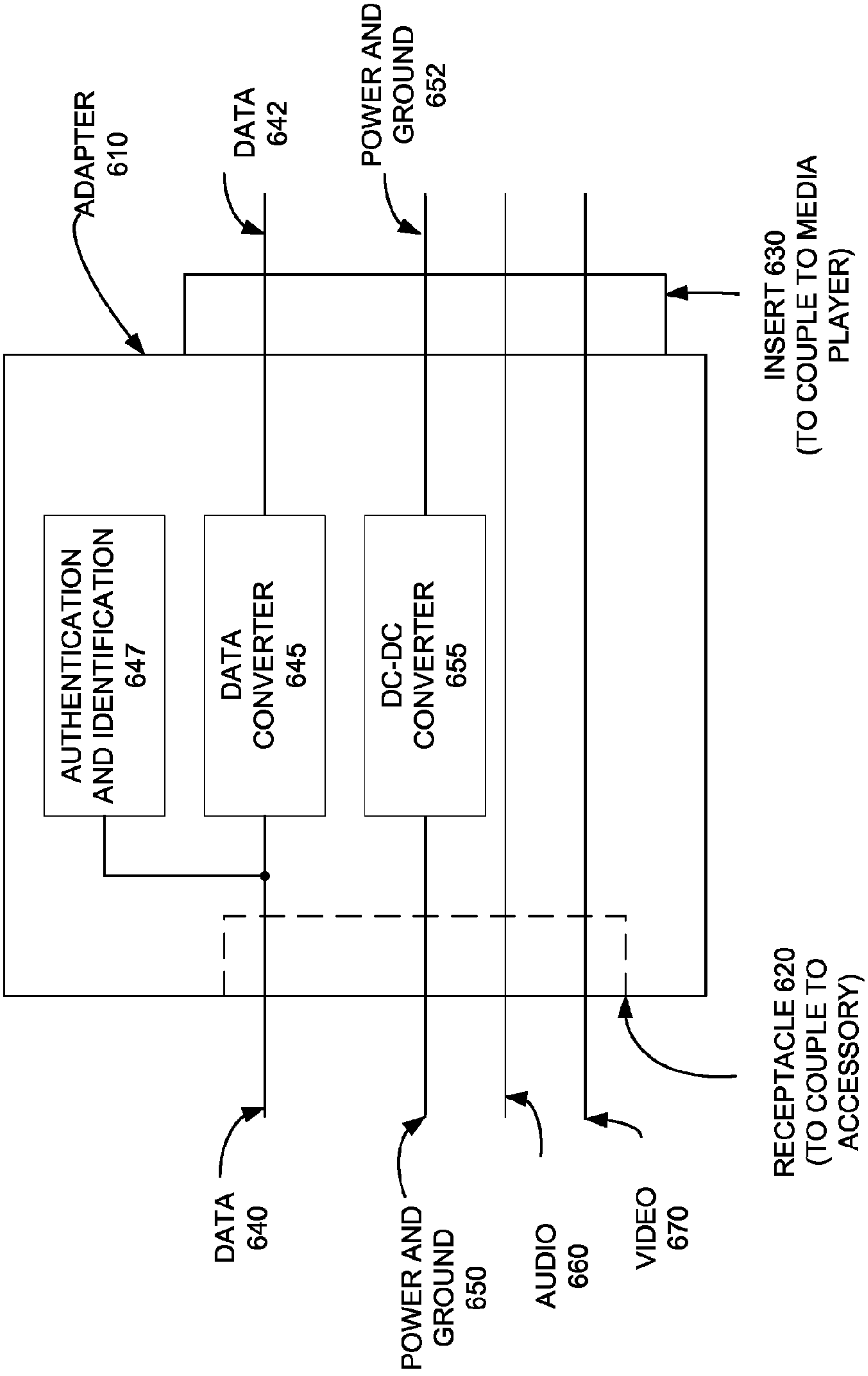
FIG. 6 illustrates an adapter that includes authentication and identification circuitry according to an embodiment of the present invention.

FIG. 6 illustrates an adapter that includes authentication and identification circuitry according to an embodiment of the present invention. This example includes an adapter 610 having a receptacle 622 to couple to an accessory and an insert 632 to couple to a portable media player. An authentication and identification circuit 647 can provide signals on data lines 640.

In one identification and authorization scheme employed by accessories and portable media players, the accessory connects and then, without prompting, provides an identification signal to a portable media player. The portable media player then determines which public key the accessory should have. The portable media player may then send an authorization request where it asks for a digital certificate. The accessory may then send this certification, which is checked by the portable media player. The portable media player may then send a random string to be encrypted by the accessory. The accessory may encrypt this string and send it to the portable media player, which then verifies the encrypted string. If these steps are properly completed, the portable media player begins or continues to communicate with the accessory, otherwise communication may be ceased. Further examples of this can be found in co-pending U.S. patent application Ser. No. 11/051,499, filed Feb. 3, 2005, titled "Accessory Authentication For Electronic Devices," which is incorporated by reference.

In some systems, the accessory may include circuitry to perform its end of this routine. However, though an adapter may be available, a portable media player may not have the circuitry or software to accomplish its task. Accordingly, the authentication and identification circuit 647 can be used to spoof an authentication response. For example, after connection to an accessory, the authentication and identification circuit 647 may receive an identification signal from the accessory. In various embodiments of the present invention, the authentication and identification circuit 647 may either use or ignore this information. It may then ask for a certificate, ignoring any response from the accessory. It may then provide a string to be encrypted, again ignoring any response from the accessory. The accessory believes it has authenticated itself, and system operation proceeds. In other embodiments of the present invention, other identification and authentication routines may be spoofed by an authentication and identification circuit 647. In various embodiments of the present invention, some of these identification and authorization tasks may be performed partly by the portable media player or the accessory.

In other systems, a video format provided by a portable media player may be different from a video format used by an accessory. In such an example, a video converter may be used. An example is shown in the following figure.

Figure 7:
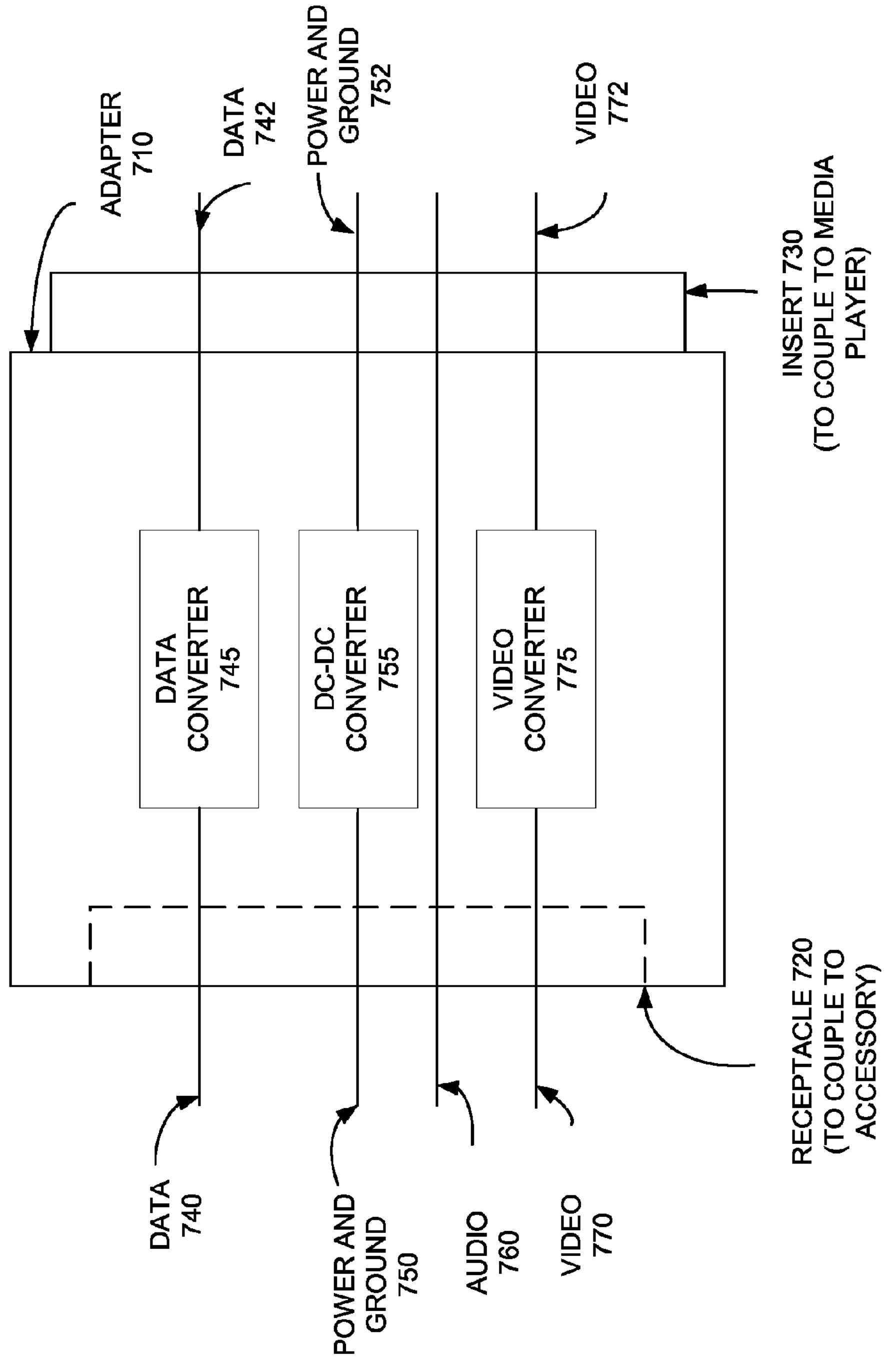
FIG. 7 illustrates an adapter including a video converter according to an embodiment of the present invention.

FIG. 7 illustrates an adapter including a video converter according to an embodiment of the present invention. This example includes an adapter 710 having a receptacle 720 to couple to an accessory and an insert 730 to couple to a portable media player. In this example, video provided on lines 772 is incompatible with video expected by the accessory on lines 770. Accordingly, a video converter 775 is inserted in the video signal path. This video converter may, for example, convert composite video to component video. In various embodiments of the present invention, some of this video conversion may be performed by the portable media player or the accessory.

In some systems, it may be desirable for a portable media player to be remotely located away from an accessory. This may be simply achieved using a cable. An example is shown in the following figure.

Figure 8:
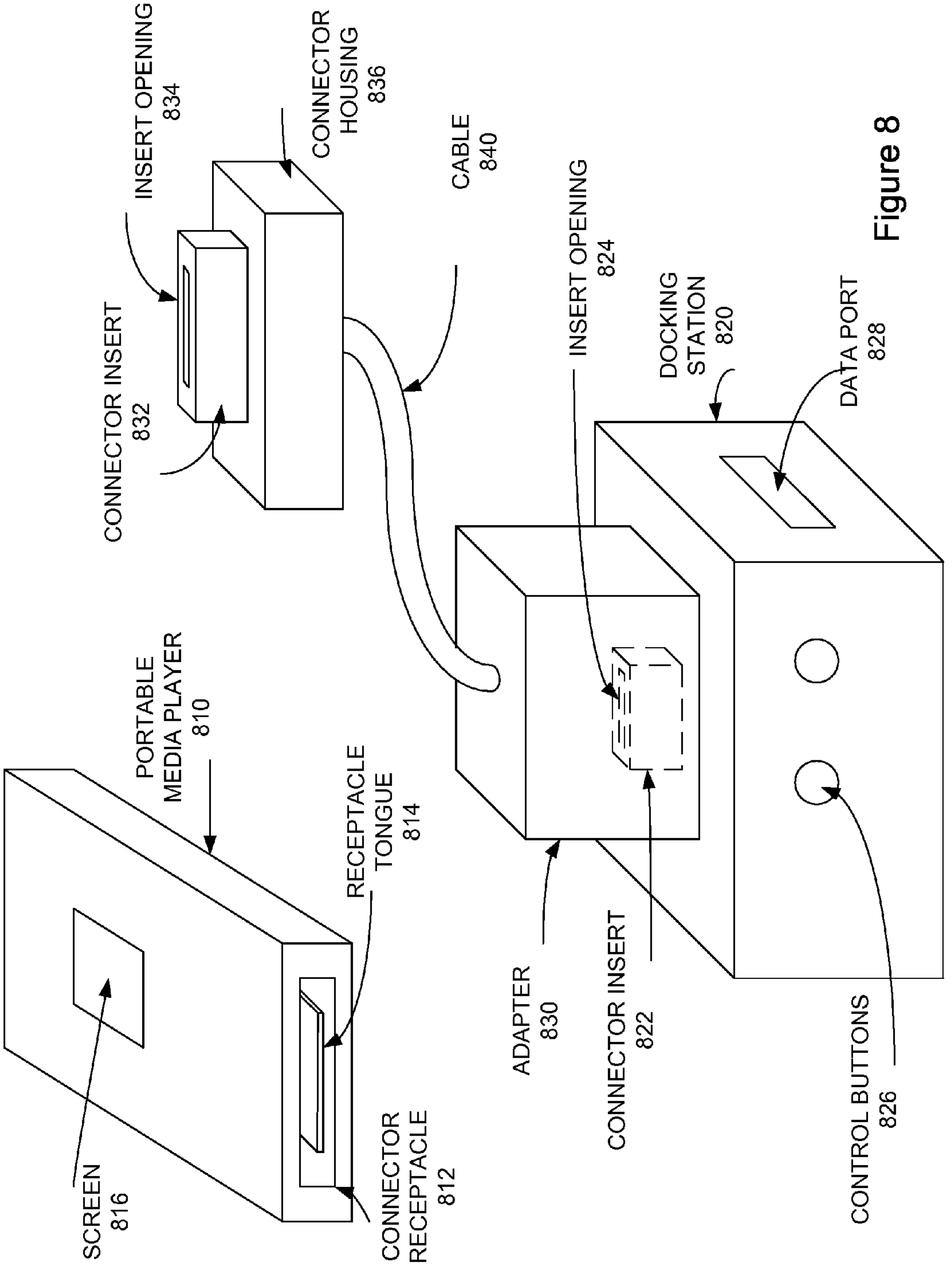
FIG. 8 illustrates an electronic system according to an embodiment of the present invention.

FIG. 8 illustrates an electronic system according to an embodiment of the present invention. This figure includes a portable media player 810 and an accessory 820. In this example, the adapter 830 is connected to a connector insert through a cable 840. The connector insert 832 fits in a connector receptacle 812. This allows the portable media player 810 to be remote from the docking station 820.

In some systems, the portable electronic device may not have a connector receptacle. Instead, it may rely on wireless circuitry. In such a situation, it may be desirable to allow the wireless portable media player to communicate with an accessory having a connector insert. An example of such a system is shown in the following figure.

Figure 9:
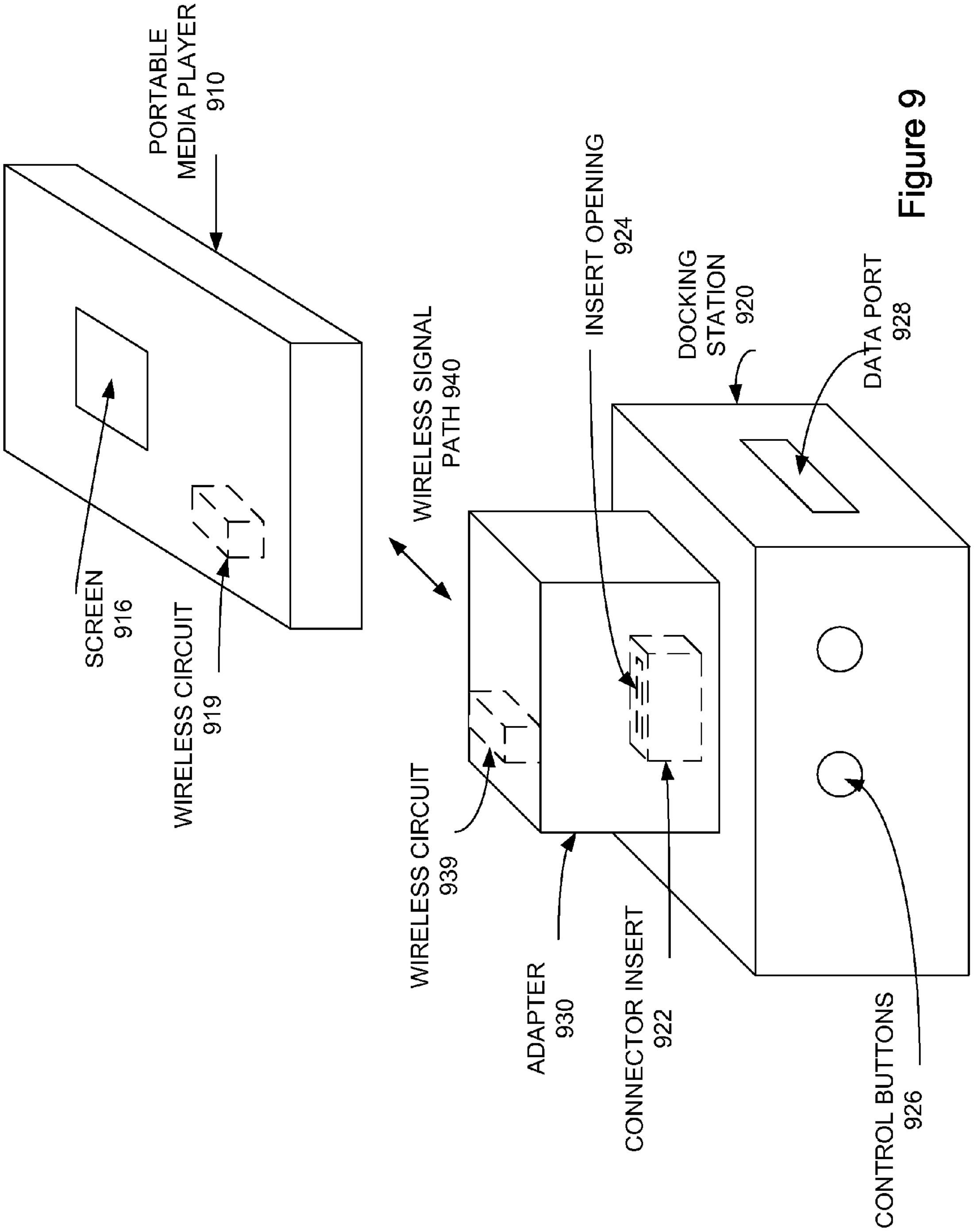
FIG. 9 illustrates an electronic system according to an embodiment of the present invention.

FIG. 9 illustrates an electronic system according to an embodiment of the present invention. This figure includes a wireless portable media player 910 and a docking station 920 having a connector insert 922. An adapter 930 interfaces between the connector insert 922 and wireless circuitry 919 in the portable media player 910 over wireless path 940. Specifically, signals received by the adapter at the connector insert 922 are converted to wireless signals by wireless circuit 939 and sent over wireless path 940 to wireless circuit 919 in the portable media player 910. Similarly, the portable media player 910 can provide signals the wireless circuit 919 over wireless signal path 940 to the wireless circuit 939 and the adapter 930. The adapter 930 receives signals at the wireless circuit 939 and provides the signal to the docking station 920 via a connector insert 922. A simplified diagram of the adapter 930 is shown in the following figure.

Figure 10:
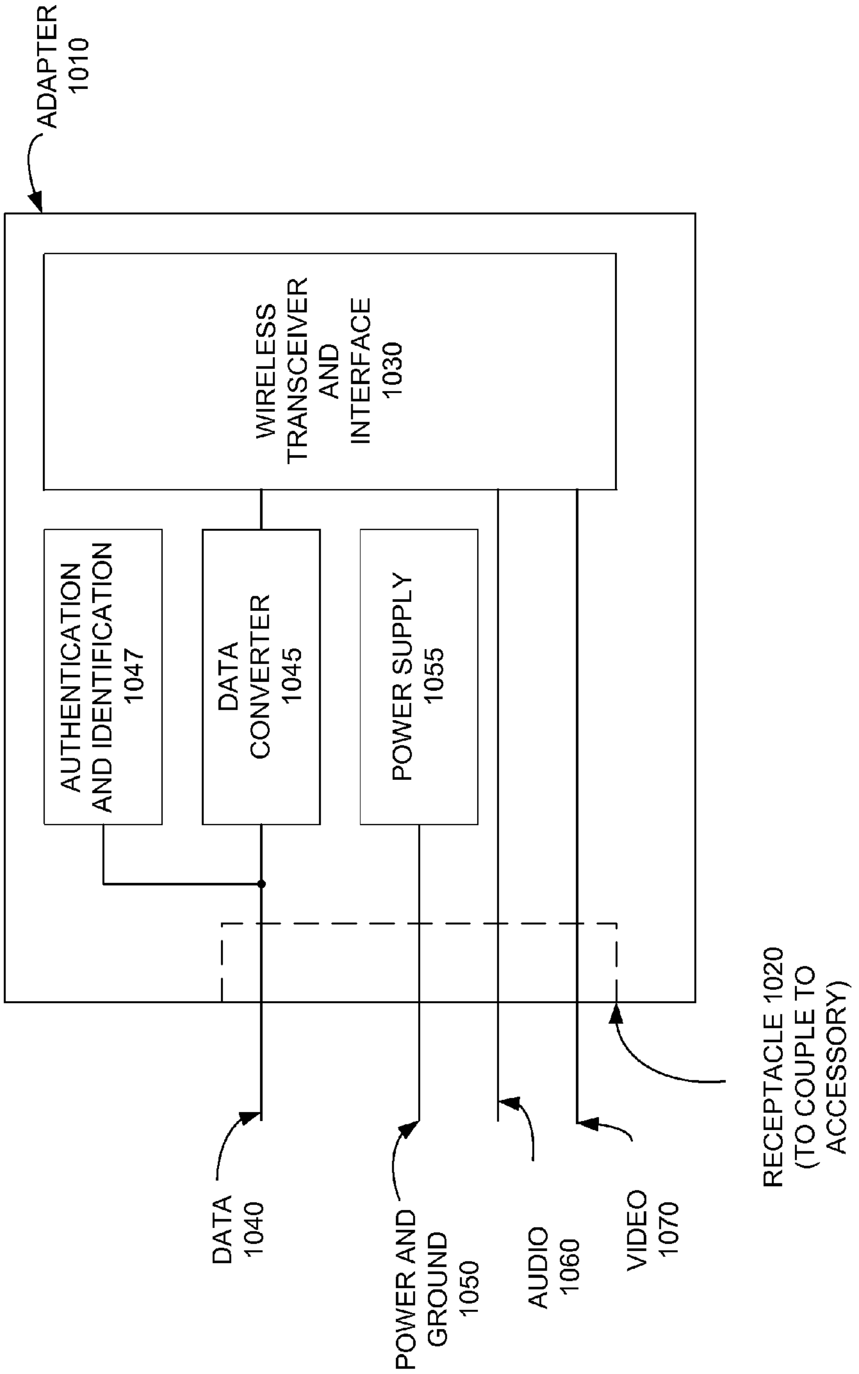
FIG. 10 illustrates an adapter according to an embodiment of the present invention.

FIG. 10 illustrates an adapter according to an embodiment of the present invention. This adapter includes a receptacle 1020 to couple to an accessory and a wireless transceiver and interface 1030 for communicating with a portable media player. Signals received at the receptacle 1020 are converted to wireless signals and provided to a portable media player. Wireless signals received from the portable media player are provided to the accessory using the receptacle 1020. The adapter 1010 may be powered by power and ground received from the accessory on lines 1050.

In some systems, the portable media player may include a connector receptacle while the accessory may be wireless. Accordingly, embodiments of the present invention provide an adapter having a wireless interface for communicating with an accessory. An example is shown in the following figure.

Figure 11:
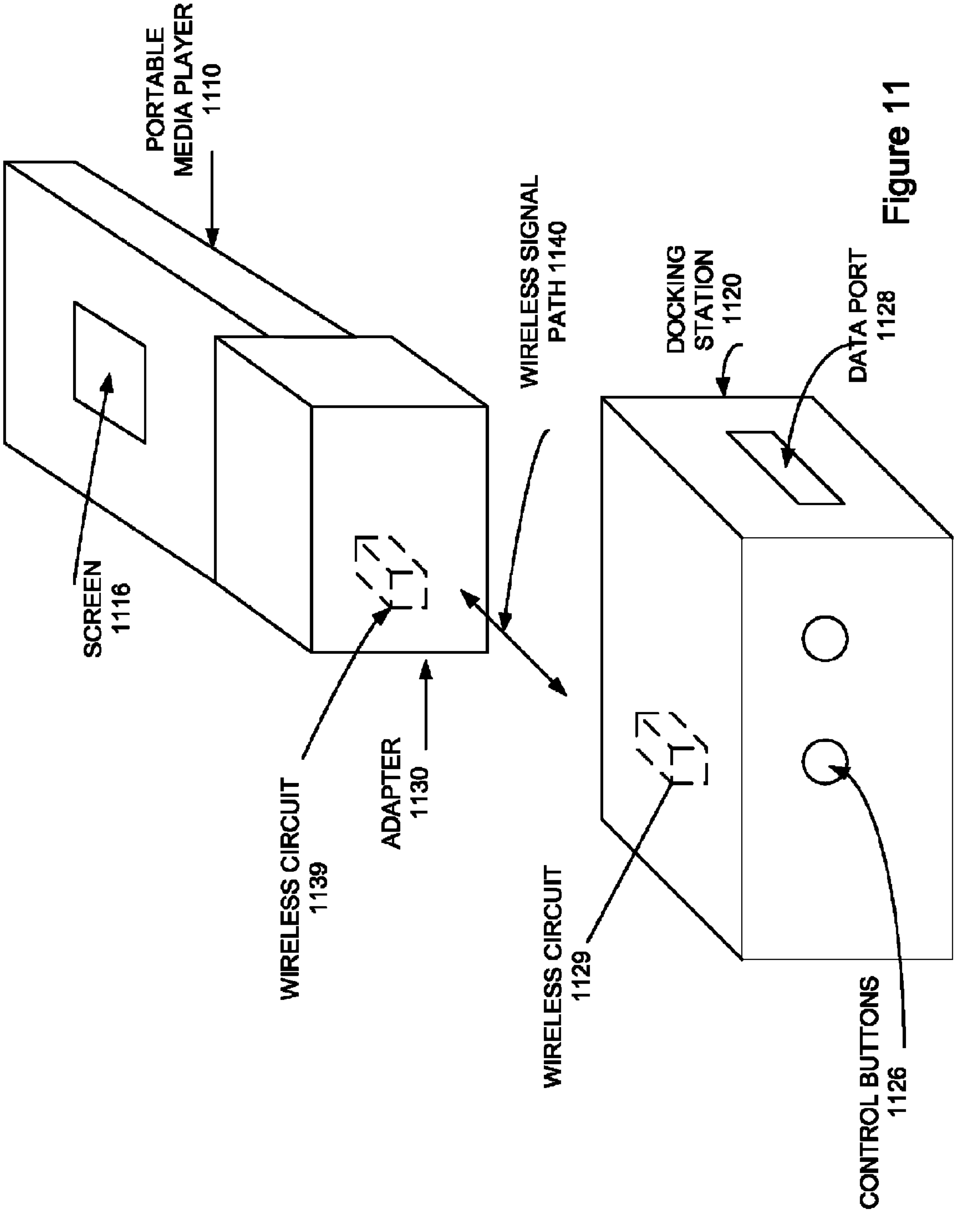
FIG. 11 illustrates an electronic system according to an embodiment of the present invention.

FIG. 11 illustrates an electronic system according to an embodiment of the present invention. This figure includes a portable media player 1110 and a wireless docking station 1120. An adapter 1130 interfaces between the portable media player and wireless circuitry 1139 in the accessory 1130 over wireless path 1140. Specifically, signals received by the adapter from the portable media player are converted to wireless signals by wireless circuit 1139 in the adapter 1130 and sent over wireless path 1140 to wireless circuit 1129 in the accessory 1120. Similarly, the accessory 1120 can provide signals via wireless circuit 1129 over wireless signal path 1140 to the wireless circuit 1139 in the adapter 1130. The adapter 1130 receives signals at the wireless circuit 1139 and provides the signal to the portable media player 1110. A simplified diagram of the adapter 1130 is shown in the following figure.

Figure 12:
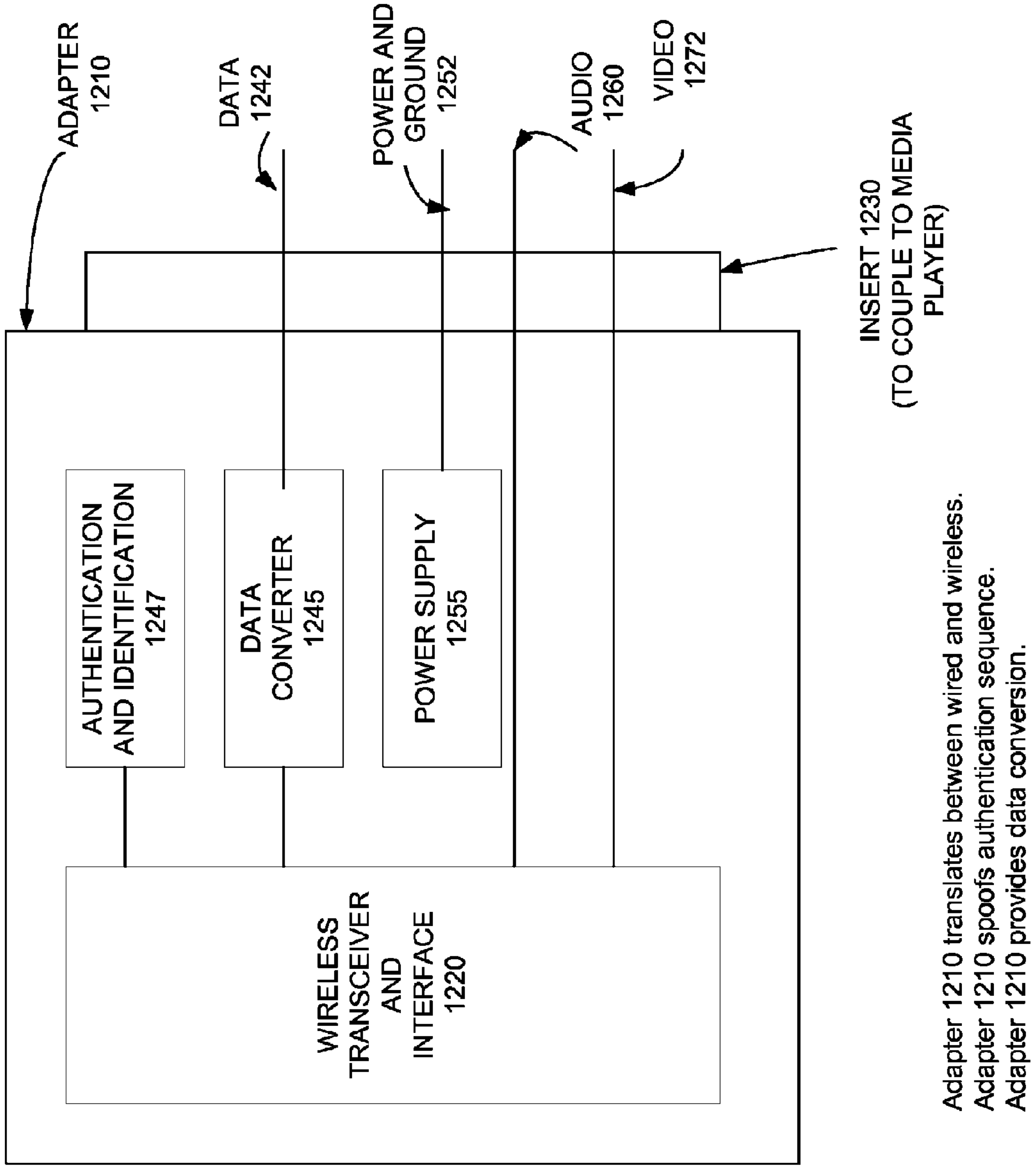
FIG. 12 illustrates a block diagram of an adapter according to an embodiment of the present invention.

FIG. 12 illustrates a block diagram of an adapter according to an embodiment of the present invention. This example includes adapter 1210 having a wireless transceiver and interface 1220 for communicating with an accessory and an insert 1230 to couple to a media player. Signals received at the insert 1220 from a portable media player are wirelessly provided to an accessory using the wireless transceiver and interface 1230. Wireless signals received from an accessory at the wireless transceiver and interface 1230 are provided to the portable media player via the insert 1220. The adapter 1210 can be powered by power and ground received on lines 1252 from the portable media player. Alternately, the adapter 1210 may include a power supply 1255 that supplies power over power lines 1252 to the portable media player.

In other systems, both the accessory and portable media player, or other portable electronic device, may be wireless. However, the wireless signaling used by the accessory and the portable media player may be incompatible. For example, an accessory may use WiFi, while a portable media player may use Bluetooth. Accordingly, embodiments of the present invention may include translation circuitry for translating between different wireless standard or propriety protocols. An example of such a system is shown in the following figure.

Figure 13:
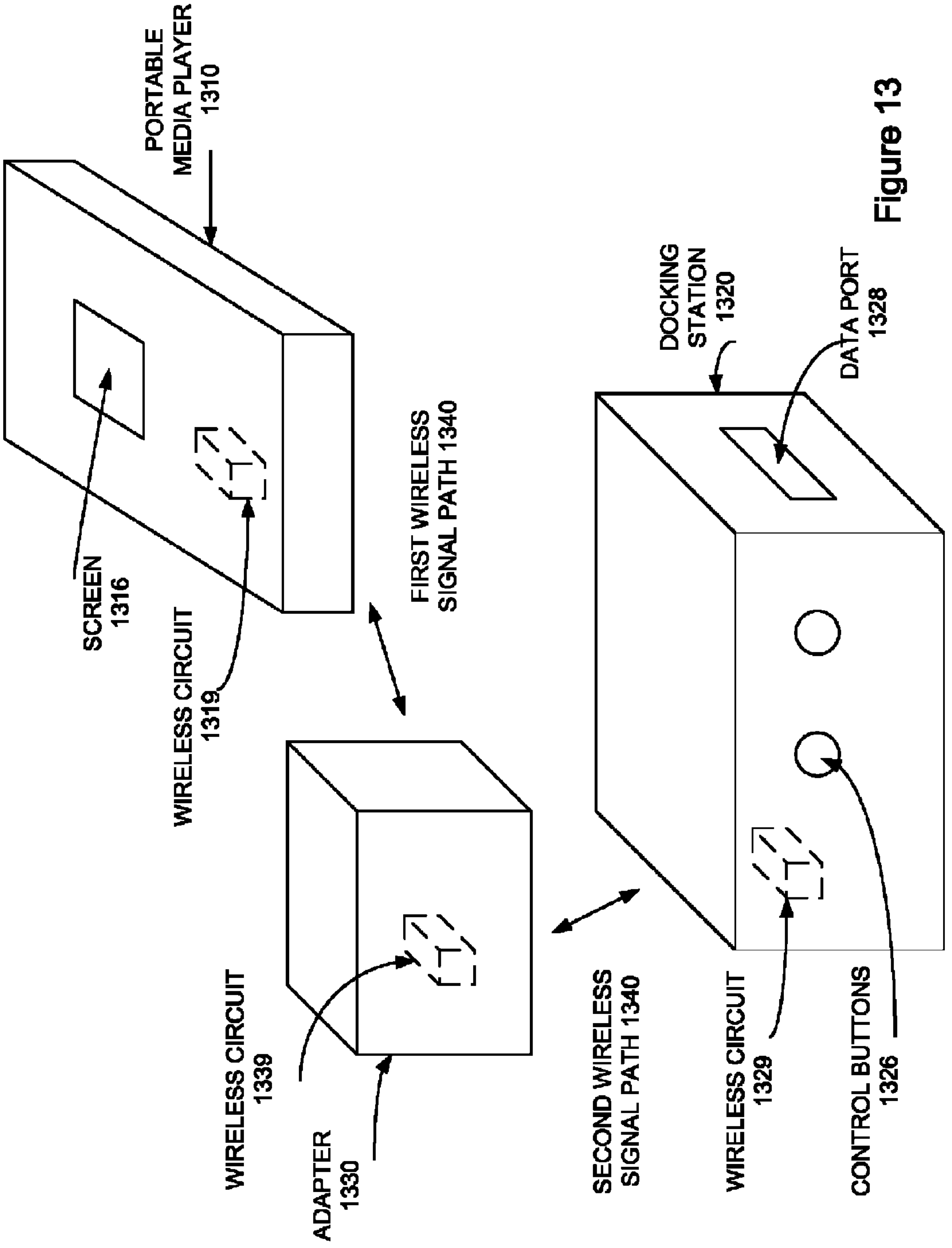
FIG. 13 illustrates an electronic system according to an embodiment of the present invention.

FIG. 13 illustrates an electronic system according to an embodiment of the present invention. This example includes a wireless portable media player 1310 having a wireless circuit 1319 and a wireless docking station 1320 including wireless circuitry 1329. A wireless adapter including wireless circuit 1339 provides a communication path between the portable media player 1312 and docking station 1320. Again, while the docking station 1320 and portable media player 1310 are both wireless, they may use different wireless technologies or protocols. Accordingly, the adapter 1330 may include translation circuitry for translating between wireless signaling technologies. An example is shown in the following figure.

Figure 14:
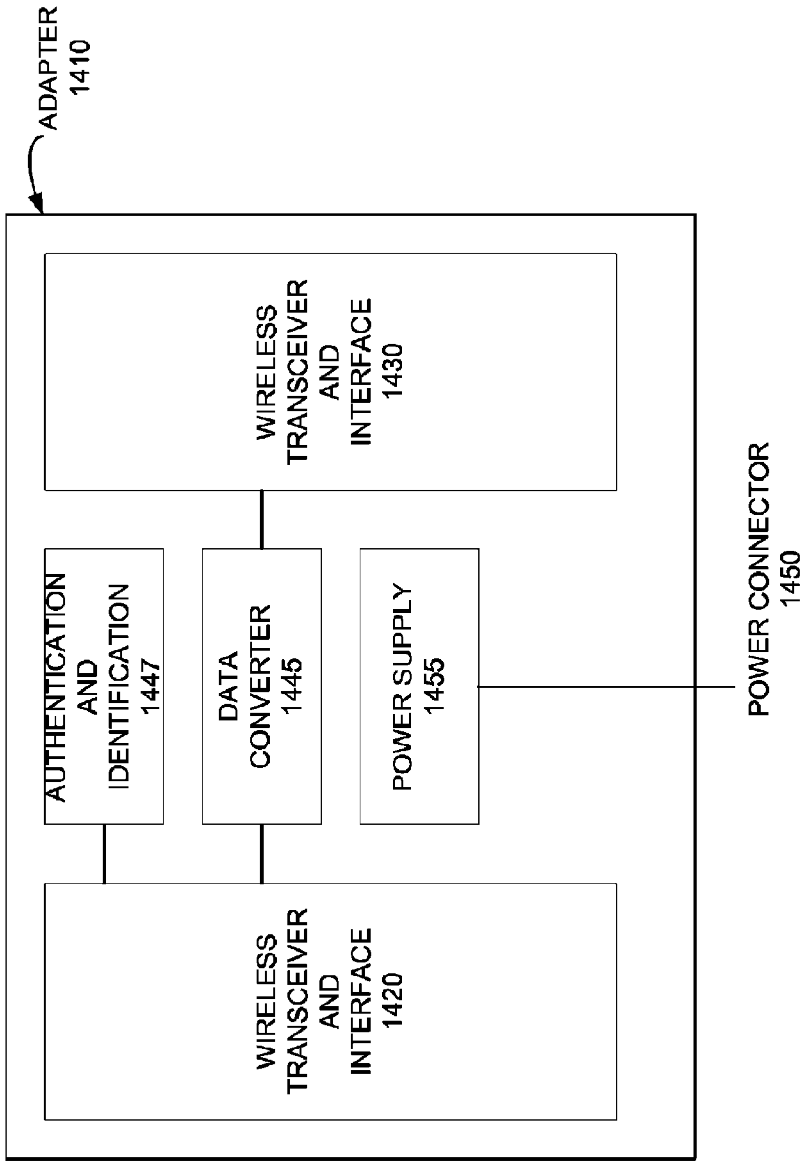
FIG. 14 illustrates a wireless adapter according to an embodiment of the present invention.

FIG. 14 illustrates a wireless adapter according to an embodiment of the present invention. This example includes an adapter 1410 having a wireless transceiver and interface 1420 for communicating with an accessory and a wireless transceiver and interface 1430 for communicating with a portable media player. Again, the wireless signaling used by the accessory may be different from the wireless signaling used by the portable media player. The difference may be in one or more of the physical, transport, packet, or other levels as described above. For example, an accessory may use WiFi, while a portable media player may use Bluetooth. Accordingly, the data translation circuitry 1445 is included. A battery may power the adapter 1410, or it may receive power via power connector 1450.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An adapter for providing a communication path between a portable electronic device and an accessory, the adapter comprising:

a connector receptacle to mate with a connector insert on the accessory;

a wireless interface to communicate with the portable electronic device;

translation circuitry configured to:

translate protocols received from the accessory at the connector receptacle to different protocols output to the portable electronic device via the wireless interface; and translate protocols received from the portable electronic device at the wireless interface to different protocols output to the accessory via the connector receptacle; and authentication circuitry to respond to an authentication query received at the connector receptacle of the adapter.

2. The adapter of claim 1 wherein the portable electronic device is a portable media player.

3. The adapter of claim 1 further comprising identification circuitry to provide identification information to the accessory.

4. The adapter of claim 1 further comprising power supply circuitry to receive power from the accessory.

5. An adapter for providing a communication path between a portable electronic device and an accessory, the adapter comprising:

a wireless interface to communicate with the accessory;

a connector insert to mate with a connector receptacle on the portable electronic device, translation circuitry configured to:

translate protocols received from the portable electronic device at the connector insert to different protocols output to the accessory via the wireless interface; and translate protocols received from the accessory at the wireless interface to different protocols output to the connector receptacle on the portable electronic device via the connector receptacle; and authentication circuitry to respond to an authentication query received at the connector receptacle of the adapter.

6. The adapter of claim 5 wherein the portable electronic device is a portable media player.

7. The adapter of claim 5 further comprising power supply circuitry to receive power from the portable electronic device.

8. The adapter of claim 3, wherein the identification circuitry provides identification information to the accessory on behalf of the portable electronic device, the identification information providing the portable electronic device's capabilities.

9. The adapter of claim 1, wherein the authentication circuitry is configured to respond to an authentication query received at the connector receptacle from the accessory with a compatibility spoof authentication response.

10. The adapter of claim 9, wherein the compatibility spoof authentication response includes a request for a certificate from the accessory.

11. The adapter of claim 10, wherein the compatibility spoof authentication response further includes a string to be encrypted.

12. The adapter of claim 11, wherein the authentication circuitry is further configured to ignore the certificate from the accessory and the encrypted string received from the accessory.

13. The adapter of claim 5, wherein the protocols are WiFi and Bluetooth.

14. The adapter of claim 1, wherein the translation circuitry translates between protocols using a first signaling technology at the connector receptacle and protocols using a second signaling technology at the wireless interface.

15. The adapter of claim 1, wherein the translation circuitry includes a video converter to convert a first video signal using a first technology provided by the portable electronic device to a second video signal using a second technology to the accessory.

16. A method of using an adapter to provide signals across a communication path between a portable electronic device and an accessory, the adapter including a connector receptacle to mate with a connector insert on the accessory and a wireless interface to communicate with the portable electronic device, the method comprising:

receiving first protocols received from the accessory at the connector receptacle;

translation circuitry of the adapter translating the first protocols to second protocols, the second protocols being different than the first protocols;

outputting the second protocols to the portable electronic device via the wireless interface;

receiving third protocols from the portable electronic device at the wireless interface;

the translation circuitry translating the third protocols to fourth protocols, the fourth protocols different from the third protocols;

outputting the fourth protocols to the accessory via the connector receptacles; and authentication circuitry responding to an authentication query received at the connector receptacle of the adapter.

* * * * *